United States Patent [19]

Murayama

[11] Patent Number: 5,577,678
[45] Date of Patent: Nov. 26, 1996

[54] HANDLE OF A FISHING REEL

[75] Inventor: Tomohiro Murayama, Tokyo, Japan

[73] Assignee: Daiwa Seiko, Inc., Tokyo, Japan

[21] Appl. No.: 264,646

[22] Filed: Jun. 23, 1994

[30] Foreign Application Priority Data

Jun. 25, 1993 [JP] Japan ................. 5-039717 U

[51] Int. Cl.⁶ .................................................. A01K 89/00
[52] U.S. Cl. ............................................ 242/283; 74/545
[58] Field of Search .................................. 242/283, 284,
242/395, 395.1; 74/545, 543, 557

[56] References Cited

U.S. PATENT DOCUMENTS

| | | | |
|---|---|---|---|
| 2,257,023 | 9/1941 | Ray ........................................ | 242/283 |
| 2,316,266 | 4/1943 | Marr ...................................... | 242/283 |
| 2,354,805 | 8/1944 | Fey ........................................ | 242/395 |
| 2,812,682 | 11/1957 | Longone ............................... | 74/545 |
| 3,529,786 | 9/1970 | Holdon ................................. | 242/395 |
| 5,328,122 | 7/1994 | Yamaguchi ........................... | 242/283 |

FOREIGN PATENT DOCUMENTS 57-23179  2/1982  Japan .

*Primary Examiner*—Katherine Matecki
*Attorney, Agent, or Firm*—Longacre & White

[57] ABSTRACT

A handle for a fishing reel comprising a flange which prevents fingers from being contacted with a handle arm to thereby prevent the fingers from being damaged or injured and also to be able to realize a safe and smooth winding operation. In the handle, a support shaft is provided on and projected from the side surface of the end portion of a handle arm, and a handle knob is securely mounted for rotation on the outer periphery of the support shaft. The handle knob includes a knob portion and a flange portion which is disposed in the base portion of one side of the handle knob. he flange portion is either formed integrally with the knob portion or removably secured to the knob portion.

6 Claims, 3 Drawing Sheets

HANDLE OF A FISHING REEL

BACKGROUND OF THE INVENTION a) Field of the Invention

The present invention relates to a handle employed in a fishing reel for winding up a fishing line round a spool whereby the handle is adapted to suitable for receiving forces in multiple directions.

b) Description of Related Art

A typical handle used to wind a fishing line round a spool is disclosed, for example, in Japanese Utility Model Publication No. 57-23179 of Showa, and structured such that a handle knob adapted to be held by angler's fingers is supported on the end portion of a handle arm in a freely rotatable manner.

However, in the actual fishing line winding operation, the angler may have to wind up the fishing line while applying an irregular force to the handle knob, i.e. prizing the handle knob back and forth as well as up and down. In this operation, the fingers holding the handle knob are easily abutted against the handle arm, so that the fingers may be damaged or injured. That is, in the conventional handle, it is not possible to perform a safe and smooth winding operation while applying forces to the handle in irregular directions.

SUMMARY OF THE INVENTION

An objective of the present invention is to solve the above-noted problems found in the conventional fishing handle.

In order to attain the above-noted and other objectives, the present invention provides an improved arrangement for a handle knob which is coupled to an end of a handle arm provided in a fishing reel and is rotatable about a first axis relative to the handle arm. The handle knob with the improved arrangement includes a first part proximate the handle arm; a second part distal from the handle arm in a direction of the first axis; and a flange extending radially outward from the first part with respect to the first axis. The flange prevents angler's fingers grasping a portion of the knob between the first and second parts from abutting against the handle arm.

DETAILED DESCRIPTION OF THE PREFERRED EMBODIMENTS

Figure 1:
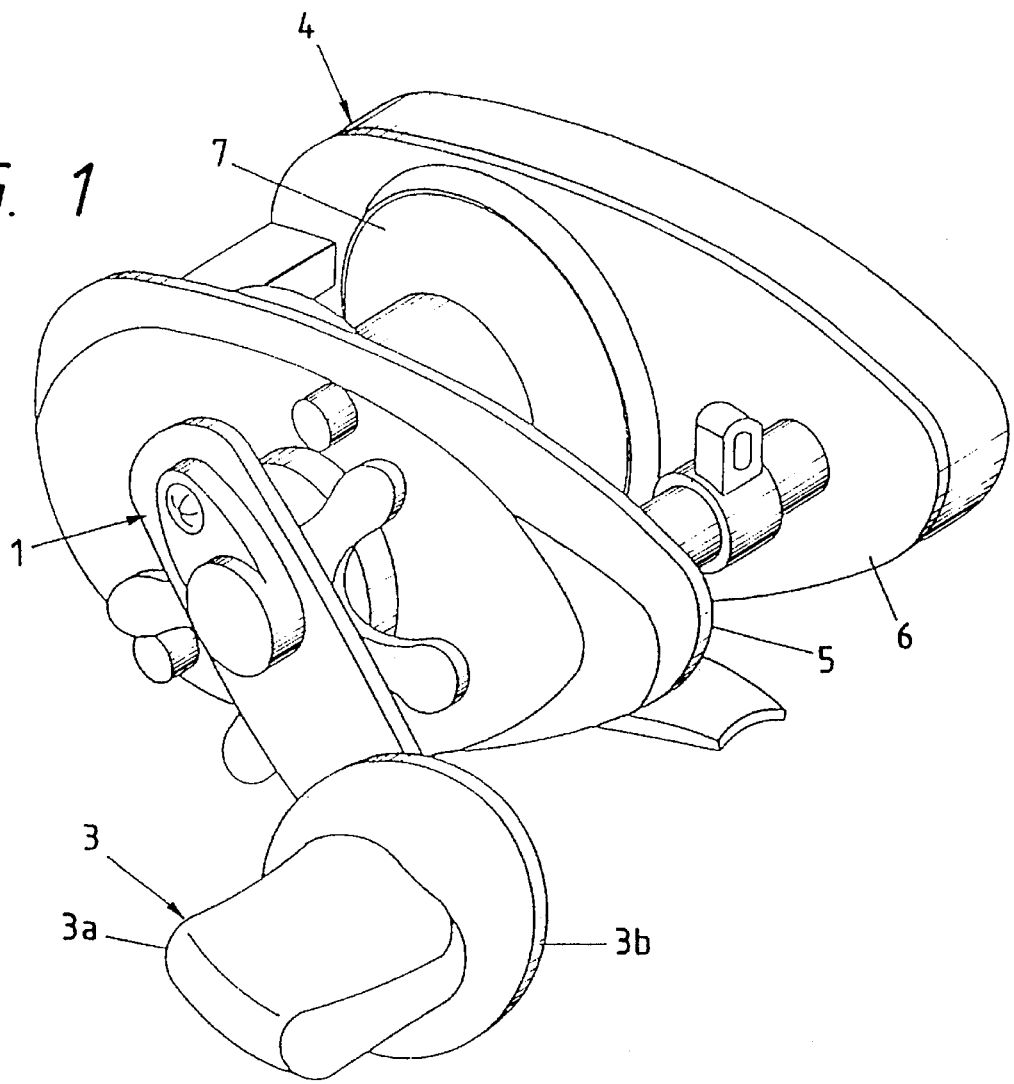
FIG. 1 is a perspective view of a dual-bearing type reel to which is applied a first embodiment of a handle according to the present invention.
Figure 2:
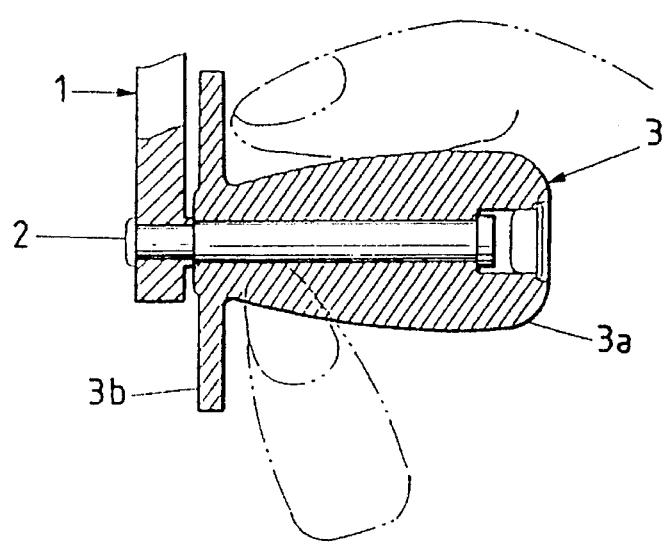
FIG. 2 is an enlarged sectional side view of the handle shown in FIG. 1.

Now, description will be given below of the invention by way of embodiments thereof illustrated in the accompanying drawings. In FIGS. 1 and 2, there is shown a first embodiment of a handle according to the invention, which handle is used in a fishing reel consisting of a dual-bearing type fishing reel. In particular, FIG. 1 is a perspective view of the dual-bearing type reel and FIG. 2 is an enlarged sectional side view of the handle shown in FIG. 1.

In the handle for the fishing reel according to the first embodiment, a support shaft 2 is provided on and projected from the end portion side surface of a handle arm 1, and a handle knob 3 is securely mounted on the outer periphery of the support shaft 2 to rotate about said support shaft. The handle knob 3 includes a knob portion 3a and a flange portion 3b which is disposed in the base portion of one side of the handle knob 3. The flange portion 3b is preferably formed integrally with the knob portion 3a, however, the flange portion 3b may be removably attached to the handle knob 3 so as to accommodate reels of different sizes.

The handle arm 1 is fixed to a handle shaft (not shown), and the handle shaft is supported rotatably by a bearing (not shown) provided in a reel main body 4.

A spool 7, which is rotatably interposed between the right and left side frames 5 and 6 of the reel main body 4, can be rotated for winding by means of the operation of the handle arm 1.

When the handle of the fishing reel is rotated, the handle knob 3 is situated at a planetary position with respect to the handle arm 1 (or a rotation center of the handle arm 1). With the knob portion 3a of the handle knob 3 held by hand, the handle arm 1 and support shaft 2 are rotated, so that the spool 7 can be rotated through the handle shaft (not shown).

In this operation, the fingers are in contact with the flange portion 3b formed in the base portion of one side of the handle knob 3 and are thus prevented from being projected toward the handle arm 1 beyond the flange portion 3b.

If the handle for a fishing reel is structured in the above-mentioned manner, then when the handle is rotated with the knob portion 3a of the handle knob 3 held by fingers, the fingers abut against the flange portion 3b formed in the one side base portion of the handle knob 3 and are prevented from being projected toward the handle arm 1 beyond the flange portion 3b. For this reason, even if a winding operation is performed while applying to the handle knob 3 such an irregular force as prizes it back and forth as well as up and down, there can be eliminated the possibility that the fingers can be damaged or injured, so that the fishing line winding operation can be performed safely and smoothly.

Figure 3:
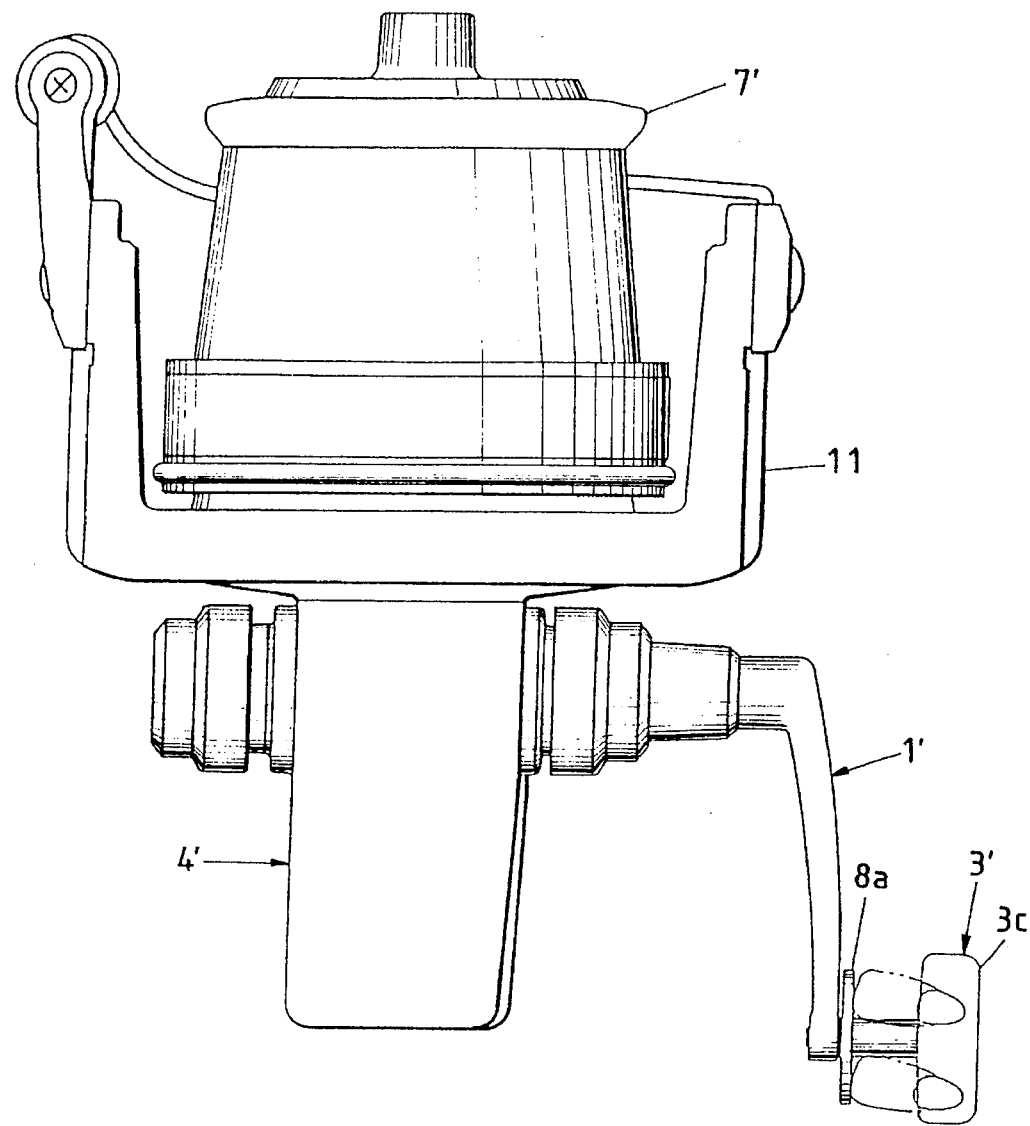
FIG. 3 is a plan view of a spinning reel to which is applied a second embodiment of a handle according to the invention.
Figure 4:
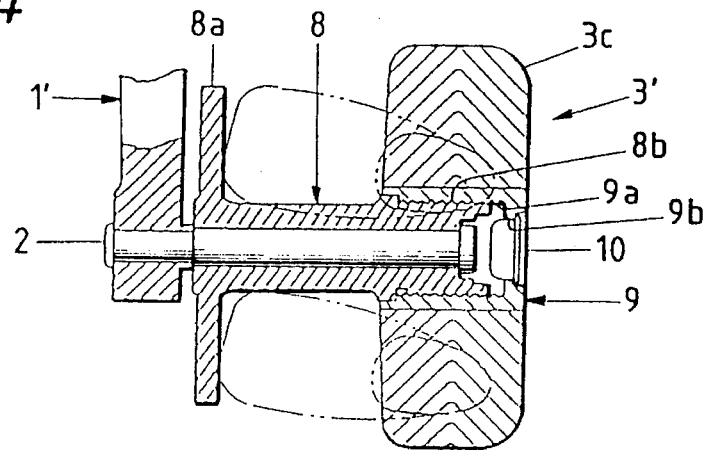
FIG. 4 is an enlarged sectional side view of the handle shown in FIG. 3.

Now, referring to FIGS. 3 and 4, there is shown a second embodiment of a handle according to the invention, which handle is used in a fishing reel consisting of a spinning reel for fishing. In particular, FIG. 3 is a plan view of the spinning reel and FIG. 4 is an enlarged sectional side view of the handle.

According to a handle for a fishing reel employed in the second embodiment, a support shaft 2 is provided on and projected from the end portion side surface of a handle arm 1', and a handle knob 3' is securely mounted for rotation on the outer periphery of the support shaft 2.

The handle knob 3' includes a knob portion 3c formed of reinforced wood, a hollow shaft portion 8, and a nut 9.

The knob portion 3c made of reinforced natural wood includes in the central portion thereof, for example, a hexagonal throughhole into which a metal nut 9 is fixedly fitted.

The hollow shaft portion 8 includes a flange portion 8a in the base portion of one side thereof and an external thread portion 8b in the outer side thereof. Both the flange portion 8a and the knob portion 3c project from the shaft portion 8 by a distance which is greater than the diameter of the shaft portion 8 to thereby define a finger receiving section therebetween.

The nut 9 includes an internal thread portion 9a and a hollow portion 9b. The internal portion 9a is threadingly engaged with the external thread portion 8b of the hollow shaft portion 8, while a dressing plug 10 is fixed to the opening of the hollow portion 9b of the nut 9 so as to cover the opening.

The handle arm 1' is fixed to a handle shaft (not shown), and the handle shaft is rotatably supported by a bearing (not shown) provided in a reel main body 4'. A rotor 11 and a spool 7' are respectively disposed in the front portion of the reel main body 4'. A winding drive mechanism as well as a rotor 11 are connected to the handle shaft (not shown).

Inside of the rotor 11, a spool 7' round which a fishing line is be wound is mounted on a spool shaft (not shown) which can be freely moved back and forth.

As similarly to the first embodiment, the handle knob 3' is situated at a planetary position with respect to the handle arm 1'. If the knob portion 3c of the handle knob 3' is held by hand and the handle arm 1' and support shaft 2 are rotated, then the rotor 11 connected through the handle shaft (not shown) and winding drive mechanism is rotated to thereby wind a fishing line round a spool 7' (not shown).

In this operation, the fingers abut against a flange portion 8a provided in the base portion of one side of the hollow shaft portion 8 and are prevented from being projected toward the handle arm 1' side beyond the flange portion 8a.

In the above description, the handle knob 3 and the hollow shaft portion 8 of the handle knob 3' are fitted directly with the support shaft 2 fixed to the end portion side surface of the handle arm 1, 1'. However, this is not limitative but, alternatively, they may be fitted via a ball bearing or the like.

Also, the handle knob 3 described in the first embodiment may comprise the support design and structure of the second embodiment, while the handle knob 3' described in the second embodiment may comprise the design of the first embodiment.

Further, in the above description, although the fishing reel is defined as a dual-bearing fishing reel and a spinning reel for fishing, a fishing reel of other type can also be used.

As noted above, various modifications can be obtained without departing from the spirit of the invention. The following two modifications are described as examples.

Figure 5:
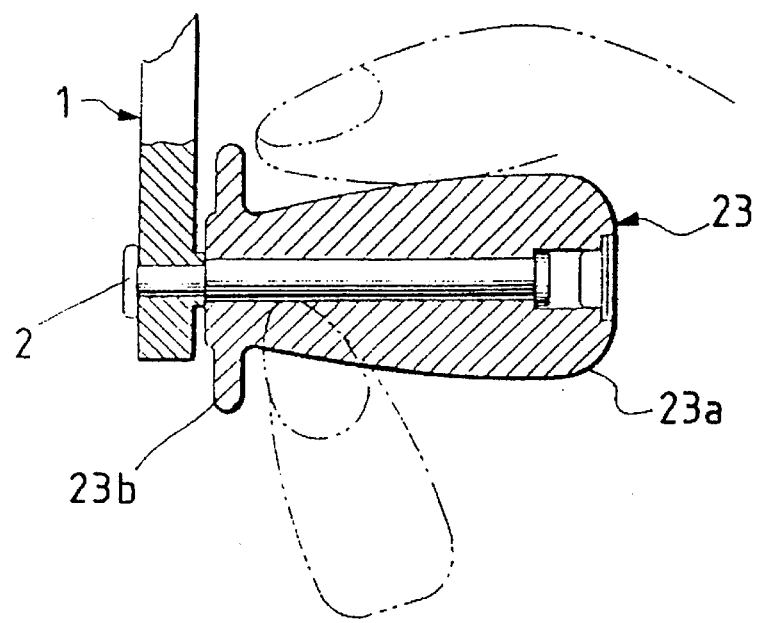
FIG. 5 is an enlarged sectional view showing a modification of the handle shown in FIG. 1.

FIG. 5 shows a handle knob 23 which is a modification of the handle knob 3 shown in FIG. 1. In the handle knob 23, the radial length of the flange portion 23b is short relative to the flange portion 23b of the first embodiment, and the outer periphery of the flange portion 23b is chamfered and rounded.

Figure 6:
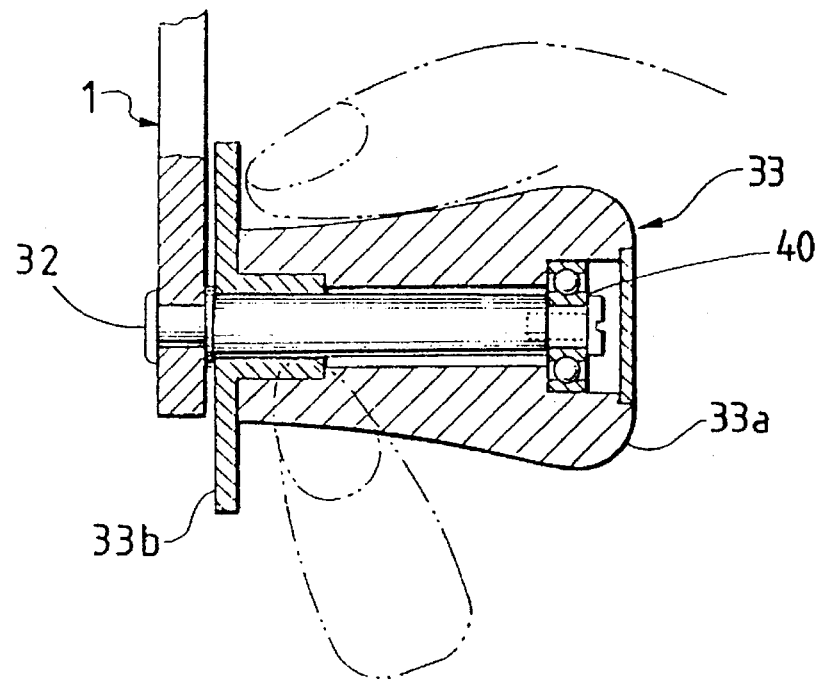
FIG. 6 is an enlarged sectional view showing another modification of the handle shown in FIG. 1.

FIG. 6 shows a handle knob 33 which is another modification of the handle knob 3 shown in FIG. 1. The handle knob 33 includes a knob portion 33a and a flange portion 33b which are separately manufactured. The flange portion 33b may be made of hard or soft synthetic resin, reinforced wood or other material. The knob portion 33a is rotatably supported on the support shaft 32 through the flange portion 33b and a bearing 40 so that a clearance is formed between the support shaft 32 and an intermediate portion of the knob portion 33a. Preferably, the flange portion 33b is coupled integrally to the knob portion 33b so as to rotate together with the knob portion 33b, but may be free from the rotation of the knob portion 33b.

Due to the fact that the invention is structured in the above-mentioned manner, when the knob portion of the handle knob is held and rotated by fingers, the fingers are abutted against the flange portion in the base portion of one side of the handle knob and are prevented from being projected toward the handle arm side beyond the flange portion. Thanks to this, even if a winding operation is executed while applying to the handle knob such an irregular force as prizes the handle knob back and forth as well as up and down, there can be eliminated the possibility that the fingers can be damaged or injured, so that a safe and smooth winding operation can be realized. That is, the invention can supply a handle for a fishing reel which provides several effects in practical use.

What is claimed is:

1. A handle knob for coupling to an end of a handle arm provided in a fishing reel and adapted to be rotated about a first axis relative to said handle arm, said handle knob comprising:

a knob body extending from said handle arm along said first axis a gripping means for receiving an angler's fingers during rotation;

a flange extending radially outward from said knob body with respect to said first axis, said flange being positioned between said gripping means and said handle arm for preventing an angler's fingers grasping said gripping means from abutting against said handle arm, wherein said flange is adapted to rotate relative to said knob body.

2. A handle knob for coupling to an end of a handle arm provided in a fishing reel and adapted to be rotated about a first axis relative to said handle arm, said handle knob comprising;

a knob body extending from a proximal end of said handle knob adjacent to said handle arm along said first axis to a distal end with respect to said handle arm, said knob body defining a cylindrical body with a first outer diameter extending along said first axis;

a gripping means for receiving an angler's fingers during rotation;

a circumferential flange extending radially outward from said proximal end of said knob body with respect to said first axis to define a radial projection having a second outer dimension at an outer periphery of said flange, said flange being positioned between said gripping means and said handle arm for preventing an angler's finger grasping said gripping means from abutting against said handle arm, and a knob portion extending radially outward from said distal end of said knob body to define a third outer dimension at an outer periphery of said knob portion, said knob body defining a finger receiving section between said flange and said knob portion, wherein both said third outer dimension of said knob portion and said second outer dimension of said flange define radial distances from said first outer diameter of said knob body which are greater than said first outer diameter.

3. The handle knob according to claim 2, wherein said knob portion is removably disposed on said second part.

4. The handle knob according to claim 2, wherein said knob portion is threadingly disposed on said second part.

5. The handle knob according to claim 2, wherein said flange is integrally formed with said first part.

6. The handle knob according to claim 2, further comprising a bearing means wherein said handle knob rotates about said first axis through said bearing means.

* * * * *